Dec. 9, 1924.  
B. FOX  
VALVE OPERATING MECHANISM  
Filed Nov. 9, 1920    2 Sheets-Sheet 1

1,518,978

WITNESS:
Louis Neirson

INVENTOR.
Benjamin Fox
PER
Murray C. Boyer
ATTORNEY

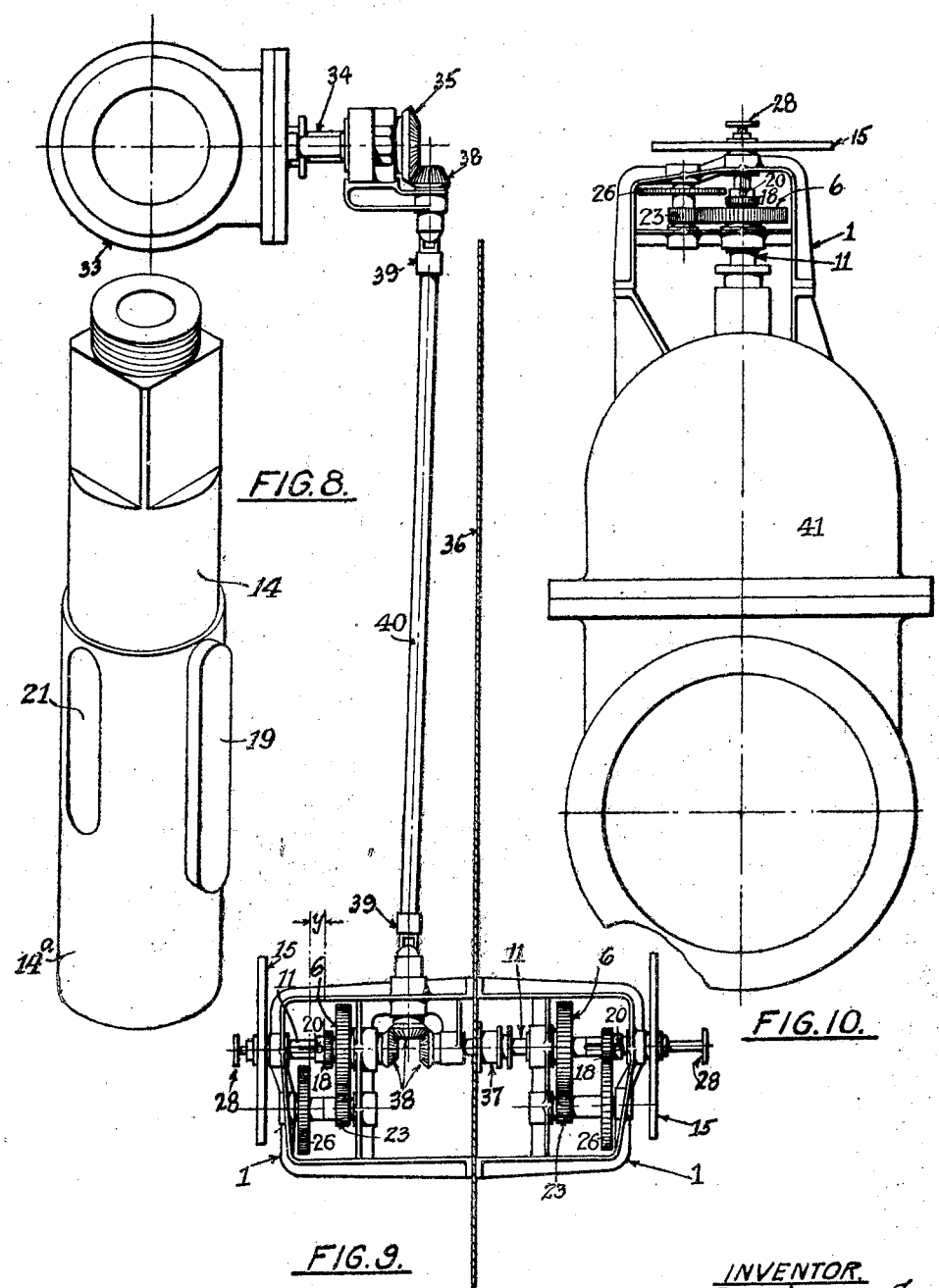

Patented Dec. 9, 1924.

1,518,978

UNITED STATES PATENT OFFICE.

BENJAMIN FOX, OF FOUNTAIN HILL, PENNSYLVANIA.

VALVE-OPERATING MECHANISM.

Application filed November 9, 1920. Serial No. 422,951.

*To all whom it may concern:*

Be it known that I, BENJAMIN FOX, a citizen of the United States, and a resident of Fountain Hill, in the county of Lehigh, State of Pennsylvania, have invented certain new and useful Improvements in Valve-Operating Mechanism, of which the following is a specification.

My invention relates to improvements in mechanism for manually operating valves in which a disk, gate or equivalent object, attached to a threaded spindle engaging with a nut, is caused, by the rotation of the spindle or the nut, to move and thereby open or close the valve or actuate an equivalent object.

In valves, as commonly constructed, the turning effort that must be applied to the spindle, or to the nut, to produce the desired motion of the disk, gate, or equivalent object, varies from a moderate value during the major portion of the operation to a much higher value at the point when the valve is just closing or just opening. In valves of the type known as stop valves, the full fluid pressure on the disk may have to be overcome at the point of closing or opening the valve. In valves of the type known as gate valves, the very great friction due to the wedging of the gate against the seat must be overcome when opening the valve. In each type, where the valve is large or where the fluid pressure in the valve is great, the turning effort required at the spindle or at the nut for opening or closing the valve may be very great.

The principal object of my invention therefore, is to provide, for the purpose of rotating the spindle or the nut and thereby operating a valve, a manually operated mechanism that will render it possible to effect the complete opening or closing of large valves, or valves subject to great fluid pressure, conveniently, with a moderate turning effort at the handwheel, and with a moderate number of revolutions of the latter.

I attain this object by providing mechanism that can be converted readily, at will, and at any stage in the operation of opening or closing the valve, from one of relatively low "mechanical advantage" to one of relatively high "mechanical advantage" and vice-versa; and means for effecting the said conversions.

These and other features of my invention are more fully described hereinafter, reference being had to the accompanying drawings, in which:

Figure 1, is a sectional elevation of one form of valve operating mechanism within the scope of my invention.

Figs. 6, 7 and 8, are perspective views of parts of the structure shown in Fig. 1, and Figs. 9 and 10, are views illustrating other forms of valve operating mechanism within the scope of my invention; showing the application of the same to different types of valves.

Figure 3:
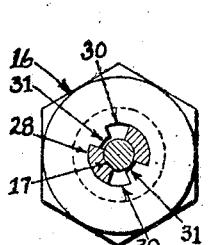
Fig. 3, is a sectional plan view, on the line III—III, Fig. 1.
Figure 4:
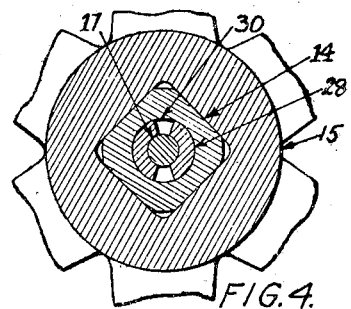
Fig. 4, is a sectional plan view on the line IV—IV, Fig. 1.

My improved structure includes a bracket or support 1 for the operating mechanism, which bracket or support may be suitably mounted, with respect to the stem of the valve to be actuated. The bracket or support illustrated in the several views of the drawings is simply a type, and it will be constructed, in each case, to suit the installation with which my improved mechanism may be employed or forms a part. This bracket may be provided with cross-bars 1ª and 1ᵇ, each having two bearings which may be provided with suitable bushings, indicated at 2, 3, 4 and 5 respectively.

A gear wheel 6, provided with a hub extension 7, is adapted to fit the bushing 2 carried by the cross-bar 1ª, and this gear wheel may be secured against longitudinal movement with respect to the bushing by means of a collar 8, threaded on said hub extension 7; which collar may be secured by a set screw 9, or by equivalent means. The hub extension 7 is provided with an axial recess 10, which may be square in cross-section, and into this recess may be fitted the end of a valve spindle 11, or other object to which a turning effect is to be applied. The opposite face of the gear wheel 6 may be provided axially with a circular recess 12, and between the recesses 10 and 12, I provide a through opening 13, polygonal in cross section, and preferably square.

A hollow shaft 14, mounted in the bracket 1, has a lower end 14ª adapted to fit the recess 12, while its upper portion is guided by the bushing 3 mounted in the cross-bar 1ᵇ. The upper end of the shaft 14 may be squared to enter a similarly shaped opening in the hub of a handwheel 15, and this handwheel may be secured to said shaft by a locking plate 16. The axial passage in the shaft 14 extends from end to end of the same, and is circular in cross-section from the point $x$ (Fig. 1), to the end passing through the hub of the hand wheel, and is polygonal in cross-section, preferably square, from said point $x$ to the end of the part 14ª entering the recess 12 in the gear wheel 6.

Disposed within the hollow shaft 14, is an adjustable plug or spindle 17, of which the lower portion 17ª is polygonal, preferably square, and the upper portion is round; the diameter decreasing in several steps.

Figure 5:
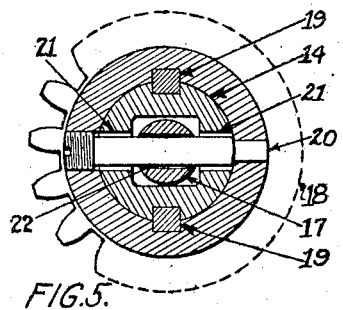
Fig. 5, is a sectional plan view on the line V—V, Fig. 1.
Figures 1, 6:
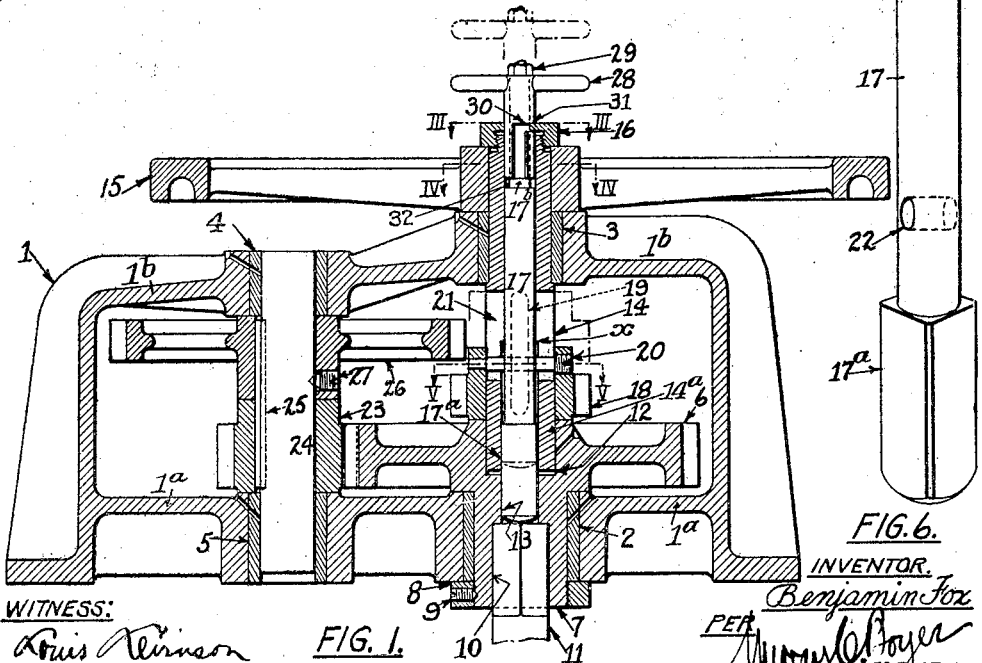

A pinion 18, mounted on the shaft 14, is caused to rotate with said shaft through the medium of feathers or splines 19, 19, and this pinion may be moved longitudinally with respect to said shaft 14 by means of a pin 20, which is fastened to said pinion 18; said pin passing through axial slots 21, 21, formed in said shaft 14, and through an aperture 22 formed in the plug or spindle 17, as clearly shown in Figs. 1 and 5.

The gear wheel 6 operatively engages a pinion 23, secured to a shaft 24, by means of a key 25; said shaft 24 being journaled in the bushings 4 and 5. Also disposed on the shaft 24, adjacent the pinion 23, is a gear wheel 26, which may be secured to said shaft by the key 25, and a set screw 27.

A hollow, shiftable key 28, fits over the upper end of the plug or spindle 17, and may be secured thereto by a nut 29. The shank of this shiftable key fits into the end of the hollow shaft 14 and is provided with oppositely-disposed L-shaped slots 30; the long leg of each slot being parallel to the axis of the shank. The locking plate 16 is provided with inwardly projecting lugs 31, 31, which are adapted to enter the slots 30 in the shiftable key 28, and as shown in Figs. 1 and 3, the lugs occupy the short legs of the slots.

Figure 2:
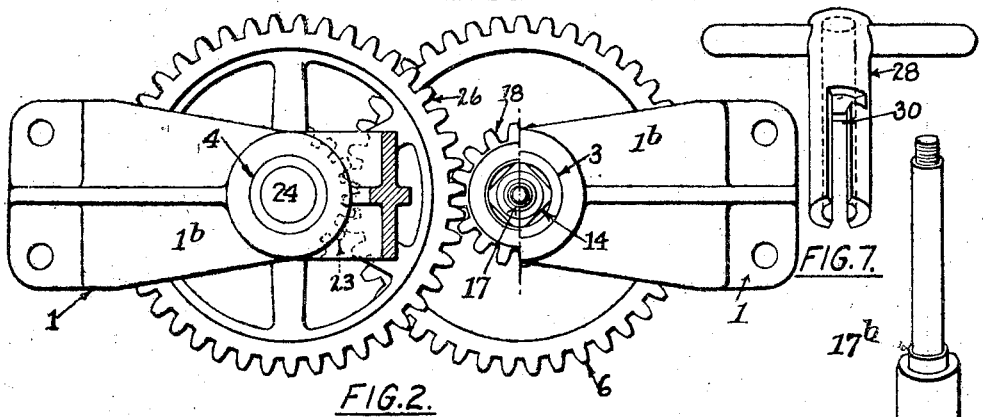
Fig. 2, is a plan view of such mechanism, partly in section, partly broken away, and with certain parts omitted.

The mechanism shown in Figs. 1, 2, et seq., may be operated in the following manner:

With the various parts in the position shown by full lines, Fig. 1, the plug or spindle 17 connects the hollow shaft 14 with the gear wheel 6, and is locked in this position by the engagement of the lugs 31, of the locking plate 16, with the key 28; said lugs entering the short legs of the L-shaped slots 30. With the several parts in this position, the pinion 23 and gear wheel 26 will rotate idly with the shaft 24, and one revolution of the spindle 11 will be effected by one revolution of the hand wheel 15. In this condition the mechanism is one of relatively low "mechanical advantage."

When it is desired to increase the power applied, the shiftable key 28 may be turned so that the long legs of the L-shaped slots 30 register with the lugs 31 of the plate 16; then lifted until the circumferential groove 32 between the lower end of the key 28 and the shoulder 17ᵇ of the plug or spindle 17, register with said lugs 31, and then turned through a small angle. This operation disengages the plug or spindle 17 from the gear wheel 6; moves pinion 18 into engagement with the gear wheel 26, and locks pinion 18 and plug 17, in the position shown by broken lines, Fig. 1. With the parts in this position, the rotation of the handwheel 15 will cause the rotation of the spindle 11, through the action of the pinions and gear wheels 18, 26, 23 and 6, respectively. The number of revolutions of the handwheel 15 for each revolution of the spindle 11 will depend upon the relative diameter of said pinions and gear wheels. With the relative proportions shown in the drawing this relation is about seven and one-half (7½) to one (1). In this condition, therefore, the mechanism is one of relatively high "mechanical advantage."

It is evident that, by the selection of appropriate pitch diameters for the gears and pinions, the value of the greater "mechanical advantage" of the mechanism can be varied between wide limits. It is also evident that additional gears and pinions may be interposed between pinion 18 and gear wheel 26, or between pinion 23 and gear wheel 6, which will permit of even greater "mechanical advantage" than may be practicable or possible with the number of gears and pinions shown in the drawings.

With mechanism such as above described applied to a large stop valve subject to great fluid pressure, the operation of closing the valve "against the pressure" would be carried out as follows:

With the mechanism in the condition for low "mechanical advantage", the hand wheel 15 is turned until the resistance to turning becomes inconveniently great. Then by changing to the condition for high "mechanical advantage" as described above, the complete closure of the valve can be easily effected.

Fig. 9, illustrates a method of applying my improved mechanism in duplicate so that a valve may be operated from either of two "stations" both of which are shown as remote from the valve. In this arrangement the distance $y$, between the gear wheel 26, and the normal position of pinion 18, must be such that the plug 17, when shifted, is entirely disengaged from the gear wheel 6, before the pinion 18 engages with the gear wheel 26. This is to avoid the possible inadvertent locking of the mechanism at one "station," which would prevent the operation of the valve from the other "station."

The arrangement shows a globe stop valve 33, in which the threaded spindle 34 engages with a nut which is incorporated in a bevel gear 35. The two operating mechanisms are shown located on opposite sides of a bulkhead 36, which may be provided with a suitable stuffing-box 37, through which the spindle 11 passes. Rotation of either hand-wheel 15 will cause rotation of gear and nut 35 (through the several pinions 38, universal joints 39, and shaft 40) and this will in turn cause motion of the valve disk in the direction of the axis of spindle 34.

As shown in Fig. 9, the mechanism on the left is in position for the initial movement of the spindle 11, through the operative mechanism disclosed, wherein a single rotation of the hand-wheel 15 will effect a single rotation of the spindle. The mechanism on the right is in the position of high "mechanical advantage", and movement of the handwheel 15 will effect movement of the spindle 11 through pinion 18, gear wheel 26, pinion 23, and gear wheel 6.

Fig. 10, illustrates a method of applying the mechanism herein described to a large gate valve indicated at 41, of the "non-rising stem" type. Here a nut engaging with the threaded spindle 11 is attached to the gate within the valve. Rotation of the handwheel 15 causes rotation of said spindle 11, which in turn causes motion of the gate in the direction of the axis of the spindle; the mechanism employed being the same as that illustrated in Fig. 1, and the manner of operating the same, either direct or through the gearing, is as hereinbefore described.

I claim:

1. The combination of a support, a gear wheel journaled therein, a hollow shaft mounted in said support with one end journaled in said gear wheel, a slidable member disposed in said hollow shaft and movable into locking engagement with said gear wheel, detachable means serving to hold the slidable member, hollow shaft and gear wheel in fixed relationship, a pinion carried by the slidable member and longitudinally movable on the hollow shaft, a countershaft, a pinion carried by said countershaft and meshing with said gear wheel, a second gear wheel carried by the countershaft for operative engagement with the pinion carried by the slidable member when the latter is withdrawn from engagement with the first-named gear wheel, and means carried by the hollow shaft and serving to rotate the first named gear wheel directly or through the countershaft when the slidable member is withdrawn from engagement with the first-named gear wheel.

2. The combination of a frame, a gear wheel journaled therein, a hollow shaft having one end journaled in said gear wheel, a slidable member disposed in said hollow shaft: said slidable member having a polygonally shaped end for engagement with the gear wheel and serving to lock the latter to the hollow shaft when in one position, a releasable key serving to hold the slidable member, gear wheel and hollow shaft in fixed relationship, a pinion carried by said slidable member and slidable on said hollow shaft, a countershaft paralleling the hollow shaft, a pinion carried by the countershaft and meshing with said gear wheel, a gear wheel carried by the countershaft for operative engagement with the pinion carried by the slidable member when the latter is withdrawn from engagement with the first-named gear wheel, and a hand wheel carried by the hollow shaft and serving to rotate the first-named gear wheel directly or through the countershaft when the slidable member is withdrawn from engagement with the first-named gear wheel.

3. The combination of a frame, a gear wheel journaled therein, a hollow shaft having one end journaled in said gear wheel, a slidable member disposed in said hollow shaft and serving to lock the latter to the gear wheel, means for holding said parts in fixed relationship including a rotatable key disposed between the slidable member and the hollow shaft, a pinion carried by said slidable member and movable therewith on the hollow shaft, a countershaft, a pinion carried thereby and meshing with said gear wheel, a second gear wheel carried by the countershaft for operative engagement with the pinion carried by the slidable member, and means for rotating said hollow shaft.

4. The combination of a frame, a gear wheel journaled therein and having a circular seat and a through bore of polygonal shape beyond said seat, a hollow shaft mounted in said frame and having one end journaled in the circular seat of said gear wheel and having a polygonal bore at such end, a slidable member disposed in said hollow shaft and having a polygonal end fitting the polygonal bore at the end of the hollow shaft and the similarly shaped through bore of the gear wheel whereby said parts may be held in fixed relationship, releasable means for holding the slidable member and hollow shaft in fixed relationship, a pinion carried by the slidable member and movable therewith, a countershaft, a pinion carried thereby and meshing with said gear wheel, a second gear wheel carried by the countershaft for operative engagement with the pinion carried by the slidable member, and means for rotating the hollow shaft.

5. The combination of a frame, a gear wheel journaled therein, a hollow shaft having one end journaled in said gear wheel, a slidable member disposed in said hollow shaft for locking the latter to the gear wheel, means for holding the slidable member and hollow shaft in fixed relationship, a pinion carried by the slidable member and longitudinally movable therewith when such holding means are released, a countershaft, a pinion carried thereby and meshing with said gear wheel, a second gear wheel carried by the countershaft for operative engagement with the pinion carried by the slidable member, and means for rotating said hollow shaft.

6. In a structure such as set forth in claim 5, a locking plate carried by the hollow shaft, and a key carried by the slidable member and arranged to lock the latter against longitudinal movement with respect to said hollow shaft; the latter being releasable from its locking engagement with the locking plate by partially rotating said key and retracting the same.

In witness whereof I have signed this specification.

BENJAMIN FOX.